United States Patent [19]

Spears, Jr.

[11] 4,078,976
[45] Mar. 14, 1978

[54] SOLAR POTABLE WATER RECOVERY AND POWER GENERATION FROM SALINOUS WATER

[75] Inventor: John F. Spears, Jr., Mount Prospect, Ill.

[73] Assignee: UOP Inc., Des Plaines, Ill.

[21] Appl. No.: 764,255

[22] Filed: Jan. 31, 1977

[51] Int. Cl.$^2$ .................... B01D 3/00; B01D 3/06
[52] U.S. Cl. .................................. 203/10; 203/49;
203/DIG. 1; 203/DIG. 20; 202/185 R;
202/234; 126/271; 60/641; 60/648; 60/677
[58] Field of Search ............... 60/641, 648, 655, 677;
126/270, 271; 202/234, 185 R; 203/10, 49, 100,
DIG. 1, DIG. 20

[56] References Cited

U.S. PATENT DOCUMENTS

| | | | |
|---|---|---|---|
| 2,636,129 | 4/1953 | Agnew | 203/DIG. 1 |
| 2,969,637 | 1/1961 | Rowekamp | 202/234 |
| 3,257,291 | 6/1966 | Gerber | 203/10 |
| 3,329,583 | 7/1967 | Othmer | 203/10 |
| 3,345,272 | 10/1967 | Collins | 203/49 |
| 3,862,545 | 1/1975 | Ellis et al. | 60/641 |
| 3,893,299 | 7/1975 | Hutchinson | 60/641 |
| 3,908,381 | 9/1975 | Barber et al. | 60/677 |
| 3,928,145 | 12/1975 | Othmer | 203/DIG. 20 |

*Primary Examiner*—Charles N. Hart
*Assistant Examiner*—Ernest G. Therkorn
*Attorney, Agent, or Firm*—James R. Hoatson, Jr.; Robert W. Erickson; William H. Page, II

[57] ABSTRACT

A process for recovering potable water from a source of salinous water — e.g. sea and/or ocean water. Certain modifications afford the simultaneous generation of power. A portion of salinous water and an air stream are introduced into a solar radiation heat sink, with the air stream flowing over the salinous water. Heated, water-containing air is withdrawn from the heat sink and reduced in temperature to condense potable water. The heated salinous water, from the heat sink, is at least in part recycled thereto, while the remainder is introduced into a plurality of flash separation zones, each succeeding one of which is maintained at a lower subatmospheric pressure than the preceding, and through which the liquid phase passes in series. In order to afford a 24-hour continuous process, the hourly rate of heated salinous water withdrawal, including evaporated water, is less than the rate of salinous water introduction to the heat sink. The resulting vaporous phases are passed through separate turbines, or through different stages of a multiple-stage turbine, from the resulting motion of which energy is recovered — e.g. power is generated. The exiting turbine vapors are cooled and/or condensed via indirect contact with a second portion of salinous water to recover additional potable water. To effect the reduction in temperature, the heated, water-containing air stream may be employed to vaporize a hydrocarbon which passes through a turbine for the purpose of producing energy. Salinous water returned to the original source thereof is at a temperature not more than 15° F. greater than the coldest salinous water obtained from the source. Where available, it is preferred that the temperature of the second salinous water portion be at least about 5° F. (2.8° C.) to about 15° F. (8.4° C.) lower than that of the salinous water portion introduced into the heat sink.

10 Claims, 1 Drawing Figure

U.S. Patent   March 14, 1978   4,078,976
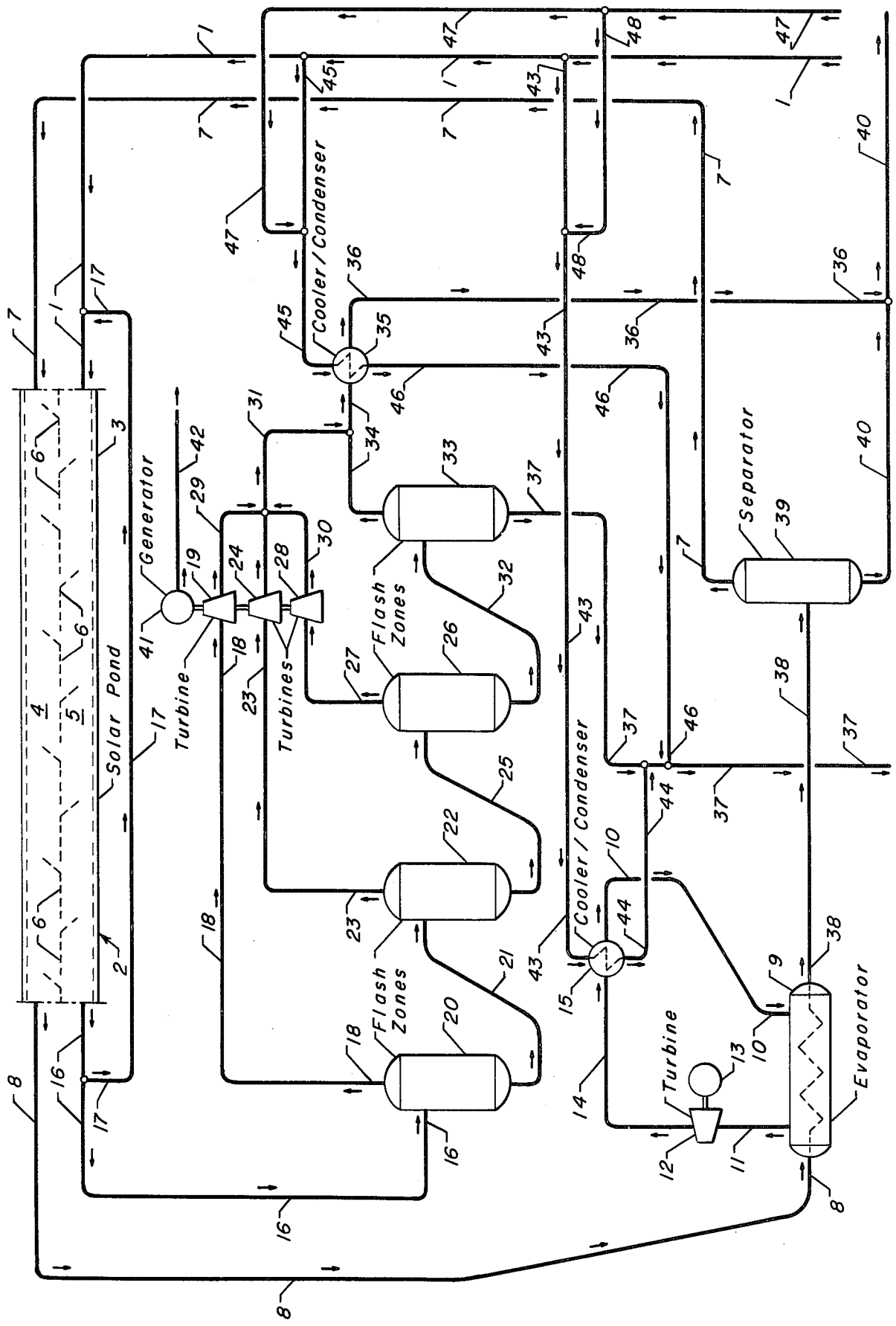

SOLAR POTABLE WATER RECOVERY AND POWER GENERATION FROM SALINOUS WATER

APPLICABILITY OF INVENTION

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is, or will soon be an established fact. One consequence, of course, is that a corresponding shortage of electrical power can be foreseen; that is, it will no longer be practical to convert one or more of these energy sources into electrical power. To alleviate this situation, consideration is currently being given to ocean thermal energy conversion, utilizing existing thermal gradients. The basic concept, first proposed by a French physicist as early as 1881, involves operating a heat engine, using warm surface water as the heat source, and cold water, from the ocean depths, as the heat sink.

In a similar vein, many areas of the world, especially those which are arid, face a critical shortage of potable water, both for human consumption and irrigation. Although sparsely located throughout the world, such areas abound particularly in the Middle Eastern countries and in the Northern desert regions of Africa. Coincidentally, many of these countries, or localized areas thereof, either border upon, or are readily accessible to sea and/or ocean waters. Also coincidental is the fact that some of these areas appear to have unlimited reserves of fossil fuels which can, albeit inefficiently and uneconomically, be utilized for electrical power generation. The process encompassed by my inventive concept, although not limited to such areas, is primarily applicable thereto. Exemplary of these are Kuwait and Saudi Arabia, the Western coast of the latter bordering upon the Red Sea.

The invention herein described is principally directed toward a technique for recovering potable water from otherwise impotable water. Although applicable to the processing of many types of brackish water and/or water having a high degree of salinity, the inventive concept is primarily intended to be utilized in recovering potable water from river, sea and/or ocean water. Basically, the present invention makes use of the natural radiant solar energy supply and, where available, the natural temperature gradients existing in ocean and/or sea waters.

Briefly, the present invention involves the use of the virtually limitless supply of natural solar energy; as hereinafter more specifically set forth, combinative use is also made of ocean thermal gradients where existing and readily obtainable. Initially, a portion of salinous water is introduced into a solar radiation heat sink — e.g. a covered solar pond. An air stream is also introduced into the heat sink in such a manner as to flow over the salinous water. These flowing streams are maintained within the heat sink, being exposed to absorbed radiant solar energy therein, for a time sufficient to increase their temperatures as well as the non-salinous water content of the air stream. The water-containing air stream is then withdrawn from the heat sink, cooled and passed into suitable separation means from which potable water is recovered. At least a portion, but preferably all of the air stream is then recycled to the solar radiation heat sink. Recycling the air stream affords a higher temperature at the inlet to the solar radiation heat sink. In a like manner, the salinous water recycled to be combined with the fresh salinous water will increase the temperature thereof.

Where energy demand and its available supply is a primary consideration, energy is recovered by employing the heated, water-containing air stream as the heat-exchange medium to vaporize a light hydrocarbon stream. Vaporized hydrocarbons pass into and through a turbine, from the resulting motion of which energy is recovered. Exiting hydrocarbon vapors are cooled and/or condensed, via indirect contact with a second salinous water portion, and re-introduced into the vaporizer. The energy recovered from the resulting motion of the turbine may be employed to generate power; however, it is more advantageous and beneficial to the present process when used to drive compressors, pumps, etc.

Where additional generated power is desired, that portion of the heated salinous water not being recycled to the solar radiation heat sink is introduced into a plurality of flash separation zones, each succeeding one of which is maintained at a lower subatmospheric pressure, and through which the salinous liquid phase passes in series flow. The plurality of vaporous phases are each passed into and through separate turbines, or into different stages of a single, multiple-stage turbine, from the resulting motion of which additional energy is recovered, or power is generated. As hereinafter more specifically set forth, the rate of salinous water addition to the solar radiation heat sink is greater than the rate of heated salinous water removed therefrom, including the non-salinous evaporated water. This technique permits operating the vacuum flash system for a 24-hour period, whereas the heat sink and air flow is operational only during the daylight hours.

From the foregoing brief description of the process encompassed by my inventive concept, it will be readily ascertained that a great degree of flexibility is afforded in varying the quantities of recovered potable water and generated power. In addition to the existing relative supply and demand of each in a given locale, other considerations are primarily concerned with capital investment and other economic aspects, and the availability of ocean thermal gradients. To reiterate, the present invention does not depend upon such ocean thermal gradients nor, for that matter, the proximity of oceans or seas. Potable water can be readily recovered from brackish and/or salinous water flowing in rivers and streams. Where, however, ocean thermal gradients of at least 5° F. (2.8° C.) to 15° F. (8.4° C.) are readily obtainable, additional benefits are afforded.

OBJECTS AND EMBODIMENTS

A principal object of the present invention involves the recovery of potable water from a source of brackish and/or salinous water. A corollary objective resides in the utilization of radiant solar energy in the recovery of potable water, accompanied by the generation of power, or the recovery of energy.

A specific object of my invention resides in the utilization of a combination of solar energy with the natural temperature gradients existing at varying depths of the oceans and seas.

Another object is to provide a technique which affords economic enhancement over the use of natural gas of fossil fuels for the generation of electrical power and the production of potable water. Still another object is directed toward increasing the effective degree to which the radiant solar energy absorbed in a solar radiation heat sink is utilized in conjunction with the available ocean thermal gradient.

These objects, as well as others, are accomplished through the utilization of one embodiment which involves a process for recovering potable water from a source of salinous water, which process comprises the sequential steps of: (a) introducing a portion of salinous water from said source into a solar radiation heat sink, at a rate greater than the total rate of water removal from said heat sink; (b) introducing an air stream into said solar radiation heat sink and flowing said air stream over said salinous water; (c) exposing said salinous water and said air stream, within said solar radiation heat sink, to absorbed radiant solar energy for a time sufficient to increase (i) the temperature of said salinous water and, (ii) the temperature and water content of said flowing air stream; (d) withdrawing the thus-heated, evaporated water-containing air stream from said solar radiation heat sink, reducing the temperature thereof and recovering potable, non-salinous water therefrom, (e) recycling the resulting cooled air stream to said solar radiation heat sink; (f) introducing heated salinous water into a plurality of vacuum flash separation zones, each succeeding one of which is maintained at a lower subatmospheric pressure than the preceding zone, (i) to produce substantially non-salinous vaporous phases equal in number to the number of flash separation zones and, (ii) wherein the salinous liquid phase is introduced in series through the plurality of zones; and, (g) passing each of said vaporous phases through a turbine and (i) cooling the exit vapors to recover additional non-salinous, potable water, and, (ii) generating power from the resulting turbine motion.

In another embodiment, the air stream is introduced into the heat sink at a temperature above about 120° F. (49° C.) while the heated, water-containing air stream and the salinous water are withdrawn from the heat sink at temperatures in the range of about 130° F. (54° C.) to about 210° F. (99° C.).

In a specific embodiment, the heated, evaporated water-containing air stream indirectly contacts and vaporizes a hydrocarbon, and the resulting vaporized hydrocarbon is introduced into and through a turbine, from the resulting motion of which energy is produced.

These, as well as other objects and embodiments, will become evident to those possessing the requisite skill in the appropriate art from the following detailed description of the present invention. First, however, a discussion of known applicable prior art is believed to be warranted.

PRIOR ART

It would appear that the greater proportion of available prior art consists of articles published in various trade and scientific journals. Three examples of these will be discussed hereinbelow. With respect to issued patents, these appear to be principally directed toward various devices capable of utilizing radiant solar energy for (1) heating homes and other types of structures, and, (2) the desalination of non-potable water. For example, respecting the latter, U.S. Pat. No. 2,803,591 (Cl. 202–234), issued Aug. 20, 1957 directs itself to a form of solar still for the purification of undrinkable water. This impure water is introduced, via spraying, into a closed and well-insulated chamber containing hot, dry air which becomes enriched with water vapor. The saturated hot air is withdrawn and cooled, yielding a condensate which is recovered as potable water. The device utilizes a series of mirrors to concentrate the rays of the sun for the purpose of heating the air which is introduced into the spray chamber.

In U.S. Pat. No. 2,813,063 (Cl. 202–234), issued Nov. 12, 1957, there is described a solar still having a wick which becomes saturated with salt water. Solar radiation heats the wick and causes the evaporation of water. The still is constructed from a semi-rigid, flexible material such as polyethylene, and is transparent with respect to solar radiation. A similar solar still, absent the wick, is illustrated in U.S. Pat. No. 2,848,389 (Cl. 202–234), issued Aug. 19, 1958.

An article entitled "Efforts to Tap Ocean Thermal Energy Gain", *Chemical and Engineering News,* Feb. 9, 1976, pp. 19–20, in part discusses the use of available ocean thermal gradients. In one particular system, a working fluid such as propane or ammonia is employed in a closed Rankine cycle. Warm surface water passes through a heat exchanger-evaporator, causing vaporization of the working fluid. The vapor is then expanded in a turbine to generate electric power. From the turbine, the vapor passes to a heat exchanger-condenser, wherein it is cooled and condensed by cold, deep ocean water, and recycled to the heat exchanger-evaporator. Since the maximum differential temperature between surface water and deep water is not appreciably greater than 40° F., this technique suffers from an extremely low thermodynamic cycle efficiency, and is, therefore, impractical on a commercial scale.

Of further interest is an article entitled "Desalination of Sea Water Using Solar Radiation Under Retarded Evaporation Conditions", *Industrial Engineering Chemistry, Process Design Development,* Volume 14, No. 4, 1975, pp. 351–358. Described is a desalination process which primarily uses the temperature difference between the surface sea water and the deep sea water. A shallow pond, swamp area, or a large heating flat is proposed for use as the radiant solar energy sink. Water, from the surface, is pumped into the pond where it is heated by solar radiation. An insoluble monolayer, or a thin, transparent plastic sheet on the water surface is suggested for suppressing the evaporative heat loss from the water layer. The heated water is fed into a heat exchanger which is a vacuum chamber. The warm sea water partly flash evaporates while it runs down a packed section. The vapor condensed in an adjoining section over cooling coils being supplied with cold deep sea water, which cooling water is returned to the sea.

U.S. Pat. No. 3,928,145 (Cl. 203–11), issued Dec. 23, 1975, is specifically referred to in an aritcle entitled "Power, Fresh Water and Food from the Sea", *Mechanical Engineering,* September, 1976, pp, 27–34. All of the subject matter in the article can be found in the issued patent, the latter being more inclusive. Therefore, the discussion which follows will be specifically directed toward the pertinency of the issued patent, from which the present invention can be readily distinguished. As initially described, in general terms, combined use is made of solar radiation and thermal gradients existing between surface and deep sea water. Warm surface water, from tropic seas, is increased in temperature through the use of a solar heater; the heated sea water is flash evaporated, or boiled at subatmospheric pressure. Sensible heat of the water supplies the latent heat of vaporization for the steam which is formed as the sea water cools. The steam expands to a lower pressure in a turbine, or other steam engine which drives a generator. The exit vapors are passed into a condenser wherein they are condensed via indirect heat-exchange with cold water from the depths of the sea. As an integral part of the the heated sea water from the condenser is introduced into a mariculture system which produces at least one specie of food fish; water from the mariculture operation is passed into the solar heater and therefrom into the flash boiler, the discharge water from which is returned to the sea.

As stated in U.S. Pat. No. 3,928,145, surface sea water is available at 86° F. (30° C.), and may be increased in temperature to about 95° F. (35° C.) by admixing therewith the warm water effluent from the mariculture pools, or to about 175° F. (78.8° C.) by flowing ponds having black bottoms and transparent covers. When utilizing a single flash evaporation zone to generate power and recover potable water, the sea water becomes cooled to a temperature of 77° F. (25° C.); at this temperature, the subatmospheric pressure within the flash evaporator is 0.46 psia. (23.8 mm. of Hg.). The resulting vaporous phase is passed through a turbine, and the exit vapors are condensed at 59° F. (15° C.) using cold sea water which is available at a temperature of 41° F. (5° C.). The latter is heated in the condensation step to 50° F. (10° C.). The resulting flashing liquid phase, at 77° F. (25° C.), is returned directly to the source of the sea water. In so doing, the disclosed process effectively wastes the available 18° F. temperature differential between 59° F. (15° C.) and 77° F. (25° C.) by not contemplating a second flash evaporation of the 77° F. (25° C.) salinous liquid phase down to 59° F. (15° C.). This would be effected at a subatmospheric pressure of about 0.25 psia. (12.9 mm. of Hg.), to recover additional amounts of potable water. In effect, there exists a waste of about 18 BTU/lb. of water.

Briefly referring to the accompanyiing drawing, the sole FIGURE presented is illustrative of several embodiments of the present invention. Upon comparison with the foregoing, it becomes irrevocably clear that there is no prior art recognition, either singularly, or collectively of the potable water recovery process which is encompassed by my invention. It should be borne in mind that the present process is particularly intended for, and affords numerous advantages in the recovery of potable water from brackish or salinous water, while simultaneously recovering energy for use within the process itself, or to generate power where either necessary, or desirable. Regardless, the prior art is believed neither to anticipate, nor render obvious the invention herein set forth. With the exception of U.S. Pat. No. 2,803,591, there is no awareness of direct contact of flowing air with the salinous water. However, the feed air to the art-disclosed process is hot and dry when introduced into the spray chamber, and neither the air, nor the sprayed salinous water increases in temperature within the spray chamber. Solar energy is employed for the solitary purpose of increasing the temperature of dry air, and not to effect evaporation from heated salinous water into heated air. As hereinafter stated, the feed air to the present process is not dry in the context of the prior art, nor is it considered to be cool. To the contrary, it is saturated and at a temperature above about 120° F. (49° C.). Where the present process generates power by way of flashing heated, salinous water, the flashing is accomplished at a temperature which permits the remaining salinous liquid phase to be returned to the source at a temperature not more than about 15° F. (8.4° C.) higher than the coldest salinous water obtained from the source, thus utilizing virtually all the readily available energy. Such is not the case with the prior art processes which are encumbered with the egregious technique of returning salinous water to the source thereof at a temperature such that energy is in fact wasted.

Other distinguishing features of the present process involve passing saturated air, preferably above about 120° F. (49° C.), into the solar pond rather than hot, dry fresh air. The latter necessitates utilizing energy to initially saturate the dry air which, in effect, uses heat sink surface area. Surface area is more advantageously utilized in evaporating water which is recoverable as potable water product. The prior art actually makes every attempt to limit evaporation from the salinous water since this effectively cools the salinous water ultimately used to recover the collected energy. Water evaporation, in accordance with the present invention, also cools the heat sink or solar pond. This is not disadvantageous since a solar pond, say at 150° F. (65° C.), is more efficient than one which functions at about 170° F. (76° C.). Additionally, the present process entails charging salinous water to the heat sink during daylight at a rate greater than that at which water (including evaporated water) is removed.

SUMMARY OF INVENTION

The present invention offers a feasible process for the desalination of water by the use of solar energy which is capable of currently being commercially acceptable. With respect to the technology demand imposed upon an installation of given capacity, there is afforded great flexibility with respect to the relative amount of generated power and the quantity of potable water recovered. That is, a commercially designed system, having a solar radiation heat sink, for example in the form of a shallow solar pond, can be so constructed that (1) the quantity of potable water recovered may be varied according to the current needs and, (2) the amount of generated power may be adjusted according to the seasonal demand. While the precise design of any given system is most certainly affected by existing economic considerations in the locale where the system is installed, being primarily the comparative values placed upon power and potable water, other factors must obviously be considered. Fundamental to the process herein described is the solar radiation heat sink, which singularly has the greatest impact upon capital expenditure.

Whether designed for maximum potable water recovery with some quantity of power being generated, for maximum power generation with whatever potable water recovery results, or for particularly desired quantities of both, two of the most important variables constitute the temperatures to which the flowing air stream and the salinous water are increased within the solar radiation heat sink. It follows that these variables are primarily dependent upon several principal factors: (1) the dimensions and efficiency of the solar radiation heat sink; (2) the available insolation, which may be conveniently expressed as the quantity of B.T.U.'s, from the sun, falling upon a square foot of heat sink surface per day, or the incidence of solar energy; (3) the temperature at which the air stream is introduced, or recycled to the solar radiation heat sink; (4) the effective residence time of the salinous water within the heat sink;

and, (5) the temperature of the salinous water introduced into the heat sink.

Another important aspect involves the existence of a sufficient ocean thermal gradient obtainable between the surface of the water source and a reasonable depth below the surface. As previously stated, the present process is not dependent upon such a thermal gradient -- i.e. at least a temperature differential of 5° F. (2.8° C.), to about 15° F. (8.4° C.), with the latter being a preferred minimum -- and can function acceptable in the absence of ocean thermal gradients. Therefore, the present process is applicable to salinous or brackish river water where a sufficient thermal gradient is, for all practical purposes, non-existent. Where, however, a temperature differential from about 15° F. (8.4° C.) to about 40° F. (22.4° C.) is available, the present technique affords enhancement in overall efficiency, especially at the higher temperature gradients.

Initially, salinous water is introduced into a solar radiation heat sink; an air stream is also introduced thereto in such a manner as to flow over the salinous water. Whether an ocean thermal gradient exists, and is readily accessible, or the temperature differential is virtually non-existent (as is the situation with flowing rivers and streams) the fresh salinous water introduced will be proximate to the surface of the source. In the former situation, the surface water is at the higher temperature, while in the latter case, the salinous water effectively exists at a single temperature for all practical purposes.

The comparative effective residence times of the salinous water and the air stream are not necessarily identical; while it is preferred to have a constantly-flowing air stream into, through and out of the heat sink, the flow of salinous water may be continual, varied, or intermittent. In accordance with the techniques herein set forth, the rate at which the salinous water is charged to the system during daylight hours (exclusive of recycled, heated salinous water) will be greater than the total rate of water removal therefrom (inclusive of evaporated water removed with the heated air stream). This permits a continual flow of heated salinous water from the solar radiation heat sink into the vacuum flash system throughout a 24-hour day. Since the solar radiation heat sink is operational only during the effective daylight hours — generally averaging ten hours per day — and the flow thereto of air and salinous water must necessarily cease during the evening, the vacuum flash separation system would otherwise necessarily be taken off-stream. To illustrate, the specific illustrative example hereinafter set forth, in describing the present invention in conjunction with the accompanying drawing, is based in part on a daily salinous water charge rate of 120,000 lb. (54,545 kg.). During the 10-hour daylight operating period, the salinous water is charged into the solar radiation heat sink at a rate of 12,000 lb/hr. (5,454.5 kg/hr.), while the heated air stream removes 45,600 lb. (20,727 kg.). Rather than charge the remaining 74,400 lb. (33,818 kg.) into the vacuum flash system at a rate of 7,440 lb/hr. (3,382 kg/hr.) for the 10-hour period, a charge rate of 3,100 lb/ hr. (1,409 kg/hr.) is employed during the entire 24-hour day.

The particular heat sink utilized may take a wide variety of forms and/or designs; in the discussion which follows, the heat sink will be presumed a solar pond as contrasted, for instance, to a flat plate collector, both of which, or a combination thereof may be utilized within the process. A covered solar pond, in the interests of initial capital investment, constitutes an economical device for absorbing a portion of the insolation falling upon it from the sun. Salinous water is pumped into the solar pond to a depth which varies seasonally, much the same as the insolation from the sum varies seasonally. Depending upon the season, as well as the desired temperature of the heated water, a pond depth in the range of about one to about ten inches is acceptable, although a solar pond depth from 2 about to bout 8 inches appears to be the most practical. The length and width of the solar pond are generally determined by the terrain and climate which are peculiar to the locale of the unit. The temperature to which the water in the solar pond is heated, as well as the air stream flowing therethrough, depends upon the relative quantities of potable water and generated power which the selected installation is designed to deliver. For example, a solar pond receiving insolation in the amount of 3,000 BTU/sq.ft./day, and functioning at an efficiency of about 60.0%, would heat a three-inch level of water from about 85° F. up to about 200° F. during a period of approximately ten daylight hours. Solar pond efficiency is determined by comparing its absorptivity with the total insolation available. In accordance with the present invention, the solar pond should be dimensioned and designed, and have an efficiency such that the flowing air stream and the salinous water both attain a temperature in the range of about 130° F. (54° C.) to about 210° F. (99° C.), and preferably above about 150° F. (65° C.). The outlet temperatures of the two streams need not be identical; in most applications, they will in fact be different. Generally, it is preferred that the salinous water have a longer effective residence time within the solar pond and thus attain a higher temperature than the air stream.

In order to increase the efficiency of the solar pond, evaporative heat loss therefrom is inhibited through the use of a covering. Suitable coverings are those which are transparent to solar radiation, while simultaneously being opaque to long wave radiation. Obviously, since the technique employed herein requires a flowing air stream, a covering is necessary to provide an enclosed system. Additionally, a suitable covering will provide an insulating effect between the air stream and water being heated, and the atmosphere, such that conductive and convective heat loss is minimized. For example, one such suitable covering would be fused hollow glass balls, or beads having a nominal diameter of about ¼-inch to about ½-inch, disposed in a layer from about ¼-inch to about 2 inches thick. A relatively thin (four to about six mils) sheet of polyvinyl chloride can be suitably employed, as can two such sheets which are uniformly tacked to provide a multitude of dead air bubbles having a minimum air gap of about one inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fuxed polyvinyl chloride bubbles, about one to two inches thick; and, a combination of polyvinyl chloride-coated fiberglass to which the polyvinyl sheet is uniformly tacked.

Also of importance, with respect to the efficiency of the solar pond, is the insulation of the sides and bottom thereof. Several techniques to accomplish this are known to those possessing the requisite skill in the appropriate art. For instance, the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styrofoam, vermiculite, etc., can be used as the lining over which the black sheet of polymeric material is placed. Insulating material can be foamed on and thus become integral with the polymeric sheet. Also, the polymeric material can be impregnated with an inorganic substance having a high absorptivity/emissivity ratio; this may be copper oxide, nickel oxide, black nickel, etc.

The covered and well-insulated solar pond may be designed and constructed in any suitable manner which fosters evaporation of non-salinous water vapor from the salinous water at the bottom of the pond, and saturation therewith of the heated air stream flowing over the salinous water. As used herein, the term "saturation" is not necessarily intended to connote 100% saturated air. Rather, it alludes to an air stream having a water content of about 95% saturation at its then-existing temperature. As a practical matter, the higher the temperature attained by both streams, the greater quantity of potable water produced from a given quantity of salinous water charged. Likewise, the quantity of generated power, where produced, increases, as does the effective degree to which insolation and the absorbed radiant solar energy are utilized. One particularly suitable solar pond is partially illustrated (in elevation) in the accompanying drawing; as shown, the flowing air stream is introduced into an area above that into which the salinous water is charged. The two discrete areas are divided, but remain in open communication by means of separated, black-bodied baffles having alternating downwardly-angled and upwardly-angled edges. These baffles provide a serpentine-like path for at least a portion of the flowing air stream. In another design, the solar pond is divided into two chambers by a solid, black-bodied solar heat collector, the upper chamber being sealed as a dead-air space; both the air stream and salinous water are introduced into the lower chamber. The solid heat collector may be provided with perpendicular heat pipes extending therethrough from the upper sealed chamber into the lower chamber; the heat pipes may extend into the lower chamber to the extent that they come into direct contact with the salinous water. Other suitable solar pond designs may be employed in the present process, none of which forms an essential feature thereof.

As previously stated, an important variable constitutes the temperature to which the air stream and salinous water are heated within the solar radiation heat sink. Also of major importance is the temperature of the salinous water originally obtained from the source and charged into the solar radiation heat sink. Regardless of the temperature of the latter, judicious operating techniques require the utilization of virtually all the resulting temperature differential. To illustrate, where an acceptable salinous water thermal gradient does not exist, or is impractical to obtain, the surface salinous water is introduced into the solar pond. Where such is available at say 80° F. (26.7° C.), and becomes heated to about 135° F. (56.8° C.) in the solar pond, energy is lost and/or wasted where salinous water is returned to the source at a temperature more than about 15° F. (8.4° C.) higher than 80° F. (26.7° C.). Similarly, where ocean surface water is available at about 85° F. (29.4° C.), and colder, deeper sea water is obtainable at about 70° F. (21.1° C.), salinous water is preferably returned to the source at a temperature not more than about 15° F. (8.4° C.) higher than 70° F. (21.1° C.). In short, the radiant energy absorbed in the solar pond should be utilized to the greatest possible extent. The process encompassed by the present invention makes such utilization technically and economically possible.

Following the prescribed period of exposure to absorbed radiant solar energy, during which time the temperature of the flowing air stream and that of the salinous water have increased to a level within the range of about 130° F. (54° C.) to about 210° F. (99° C.), the water-saturated air stream is introduced into a vessel which functions as a cooler/condenser. The condensate is recovered from a subsequent vapor/liquid separator as potable water, and the airstream recycled to the solar pond. Where only the recovery of potable water from this air stream is intended, the vessel into which the heated, saturated air stream is introduced may be an air-cooled (ambient air) condenser, or one which utilizes salinous water via indirect heat-exchange. In either event, the coolant need not be "cold" since it is preferred that the air stream recycle to the solar pond be at a temperature above about 100° F. (37.8° C.), and preferably at least about 120° F. (49° C.). The water content of saturated air is exponential with increased temperature, and cold air cannot accept large amounts of water. Therefore, the more environmentally acceptable ambient air cooling is not only practical, but acceptable. Recirculation of hot air also affords more efficient utilization of the heat sink surface area in view of the fact that any portion not being used to heat cold air is functioning at maximum capacity for effecting the evaporation of water. Elevated air inlet temperatures also provide for subatmospheric flashing of the relatively warm condensate, the resulting vaporous phase being passed through a turbine, from the resulting motion of which energy may be recovered.

The heated, saturated air stream emanating from the solar pond may also be introduced into an evaporator wherein it vaporizes a hydrocarbon by way of indirect contact therewith. Of course, the air stream is cooled as a result, and may be passed directly into the aforementioned vapor/liquid separator. The vaporized hydrocarbon is introduced into a turbine, from the resulting motion of which energy is recovered. This energy may, of course, be employed to drive a generator for resulting power generation. However, since air circulation throughout the overall process contributes a large share of the utilities cost, a preferred technique involves driving an air compressor with the energy produced via the turbine motion. Hydrocarbon vapors exiting from the turbine are cooled and/or condensed, and re-introduced into the vaporizer.

Preferred classes of hydrocarbons, for use in the vaporization cycle, are paraffins and mono-olefins containing from about one to about four carbon atoms per molecule, and include, therefore, methane, ethane, ethylene, propane, propylene, butane and butylene (including its isomers), as well as mixtures thereof. Especially preferred are propane, propylene, butanes and/or butylenes. Halogenated hydrocarbons, containing fluorine and/or chlorine, most of which are categorized under the generic name "Freon" (a trademark for a line of fluorinated hydrocarbons) may also be employed in the hydrocarbon system, or vaporization cycle. Exemplary of these halogenated hydrocarbons are trichloromonofluoromethane, dichlorodifluoromethane, monochlorotrifluoromethane, monobromotrifluoromethane, tetrafluoromethane, monochlorodifluoromethane, trichlorotrifluoroethane, dichlorotetrafluoroethane, octafluorocyclobutane, tetrachlorodifluoroethane, etc.

The heated salinous water withdrawn from the solar radiation heat sink, and after diversion of a predetermined quantity to be recycled, is introduced into a plurality of vacuum flash separation zones, each succeeding one of which is maintained at a lower subatmospheric pressure, and through which the salinous liquid phase passes in series flow. Generally, the number of individual flash zones in the system will range from about two to about ten, although from these to about eight is most practical. The precise number will be dependent upon the comparative quantities of potable water and generated power desired. As a general rule, where the number of flash zones is increased for the purpose of increasing power generation, there exists a corresponding decrease in potable water recovery. The first vacuum flash zone in the plurality will be maintained at a subatmospheric pressure from about 2.5 psia. (129.3 mm. of Hg.) to about 8.5 psia. (439.6 mm. of Hg.). and the last power flash zone at a subatmospheric pressure in the range of about 0.9 psia. (46.5 mm. of Hg.) to about 3.5 psia. (181 mm. of Hg.).

The vaporous phases from the vacuum flash system are individually passed into and through separate turbines, or into different stages of a single, multiple-stage turbine. In either event, the resulting turbine motion is used to generate power or otherwise recover energy. As hereinbefore stated in the discussion of known, applicable prior art, it is impractical to return salinous water to the source thereof at a temperature more than about 15° F. (8.4° C.) above the temperature of the coldest salinous water withdrawn from the source thereof. Therefore, where appropriate, the salinous liquid phase from the last flash zone in the power flash system, will be introduced into a final flash zone, maintained at a lower absolute pressure than the last power flash zone to provide another non-salinous vaporous phase and a salinous liquid phase at a temperature not substantially greater than above-described. The final vaporous phase is combined with the exiting turbine vapors, and cooled and/or condensed to recover additional potable water.

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances is well within the purview of one skilled in the appropriate art, and the use thereof to modify the illustrated process will not create a departure from the scope and the spirit of the appended claims.

BRIEF DESCRIPTION OF THE DRAWING

With specific reference now to the drawing, the sole FIGURE represents particularly preferred embodiments of the potable water recovery process which is encompassed by the inventive concept herein described. Further description, in conjunction with the drawing, will be founded upon the availability of surface sea water at a temperature of about 85° F. (29.4° C.) and colder, deeper sea water at about 70° F. (21.1° C.).

As illustrated, the evaporated water-containing air stream in line 8 is used to vaporize a hydrocarbon in evaporator 9, the resulting vapors being passed into and through turbine 11. With respect to the power flash system, three individual zones, 20, 22 and 26, are employed. These will function at subatmospheric pressures of: 2.5 psia. (129.3 mm. of Hg.) to about 8.5 psia. (439.6 mm. of Hg.); 1.5 psia. (77.6 mm. of Hg.) to about 5.5 psia. (284.4 mm. of Hg.); and, from 0.9 psia. (46.5 mm. of Hg.) to about 3.5 psia. (181 mm. of Hg.), respectively. Since the illustrated example is based upon the availability of an ocean thermal gradient where the colder water is obtainable at about 70° F. (21.1° C.), a final flash zone 33 is used to provide a 75° F. (23.9° C.) salinous liquid phase in line 37. In most applications, this last flash zone will be maintained at a subatmospheric pressure in the range of about 0.35 psia. (18.1 mm. of Hg.) to about 0.75 psia. (38.8 mm. of Hg.).

DETAILED DESCRIPTION OF DRAWING

Air introduced into the solar radiation heat sink will be 100% saturated at a temperature of 130° F. (54.4° C.). The solar pond will accommodate a total salinous water charge of 120,000 lb. (54,545 kg.) over the approximate 10-hour daylight period, and will be sized such that the exit air is 90.0% saturated at a temperature of 200° F. (93.3° C.); salinous water withdrawn from the solar pond will also be at a temperature of 200° F. (93.3° C.). As a general principle, the salinous water emanating from the solar pond should be at a temperature at least equal to, and preferably higher than that temperature at which 100% saturated air would have the same water content (lb./lb. of dry air) as the exit air has at its temperature and degree of saturation. Thus, in the illustrative example, where 200° F. (93.3° C.) air is 90.0% saturated and contains about 2.066 lb. water/lb. dry air, 100% saturated air at this water content would have a temperature of about 198° F. (92.2° C.), which is the minimum temperature to which the salinous water should be heated.

As previously stated, the existence of an ocean thermal gradient, although advantageous, is not essential to the present invention; however, this illustration is presented with the premise that a 15° F. (8.4° C.) thermal gradient is available and readily accessible. It should be noted that the flow rates set out herein are specific to the assumed operating condition and also that they are averages of the flow rates to result over the respective 10 or 24 hour per day operating cycle. The temperatures and pressures specified will also vary during the operation of the process. Salinous sea water from the surface of the source thereof, in the amount of about 12,000 lb/hr. (5,454.5 kg/hr.) and at a temperature of 85° F. (29.4° C.), is introduced into the process by way of conduit 1, and admixed with 6,000 lb/hr. (2,727 kg/hr.) of a recycle stream in line 17. The fresh salinous water is about 5.0% saline, containing 600 lb/hr. (272.7 kg/hr.) of salts, while the recycle stream is about 8.06% saline, containing about 484 lb/hr. (220 kg/hr.). The mixture, continuing through line 1 into solar pond 2, is 6.02% saline; the various salinous material are predominantly the sulfates and chlorides of sodium, potassium, calcium and magnesium, etc. Also introduced into solar pond 2, via line 7, is a 100% saturated air stream, containing 0.112 lb. water/lb. dry air at a temperature of 130° F. (54.4° C.), at the rate of 2,594 lb/hr. (1,179 kg/hr.); this heated air stream contains 260 lb/hr. (118.2 kg/hr.) of non-salinous water vapor.

Solar pond 2 is provided with a covering 3, of the type hereinbefore described, and is divided into upper and lower chambers 4 and 5 2.066 a separated series of black-bodied baffles 6 having alternating downwardly-angled and upwardly-angled edges. These provide a serpentine-like flow for at least a portion of the air stream through chambers 4 and 5 to facilitate evaporated non-salinous water pick-up. Solar pond 2 is sized such that (i) 40% by weight of the entering salinous water is evaporated and, (ii) the exit air stream in line 8 is 90% saturated at a temperature of 200° F. (93° C.), thereby containing 20 lb. water/lb. of dry air; the salinous water exiting the solar pond via line 16 is also at a temperature of 200° F. (98° C.).

In the previous discussion of the prior art, it was shown that salinous sea water should not be returned to the source at a temperature more than 15° F. (8.4° C.) higher than the coldest available salinous water. This illustration is intended to show the added benefits of flashing the salinous water emanating from the solar pond, and will presuppose the availability of a reasonable ocean thermal gradient. Furthermore, the hot air stream, containing evaporated non-salinous water, emanating from the solar pond will be used to vaporize a hydrocarbon. Hydrocarbon vapors will pass into and through a turbine, from the resulting motion of which energy will be recovered.

Heated salinous sea water will be removed from solar pond 2, by way of line 16, in the amount of 9,100 lb/hr. (4.136 kg/hr.); of this amount, 6,000 lb/hr. (2,727 kg/hr.) are diverted through conduit 17 as recycle, to be combined with the fresh salinous water in line 1, as a result of which, the temperature thereof is increased from 85° F. (29.4° C.) to 125° F. (50.6° C.). The remaining 3,100 lb/hr. (1,364 kg/hr.) of heated water, containing 250 lb/hr. (113.6 kg/hr.) of salt, continue through line 16, being introduced thereby into vacuum flash zone 20.

The heated air stream, containing 4,820 lb/hr. (2,191 kg/hr.) of non-salinous water, of which 4,560 lb/hr. (2,073 kg/hr.) were evaporated in solar pond 2, is 90.0% saturated at 200° F. (93.3° C.), or 2.066 lb. water/lb. This stream is introduced, through conduit 8 into hydrocarbon vaporizer 9. Liquid phase isobutane, at a temperature of about 75° F. (23.9° C.) and in the amount of about 29,987 lb/hr. (13,630 kg/hr.), is introduced into vaporizer 9 by way of line 10; isobutane vapors, at a temperature of about 120° F. (48.9° C.) and a pressure of about 95 psia. (6.46 atm.) are withdrawn via line 11 and introduced thereby into turbine 12. Exiting hydrocarbon vapors pass through conduit 14 into cooler/condenser 15 wherein their temperature is decreased to about 75° F. (23.9° C.) via indirect contact with 70° F. (21.1° C.) sea water from line 43. The warmed sea water is returned to the source by way of lines 44 and 37, while the condensed isobutane is recycled to vaporizer 9 via line 10. The downstream turbine pressure and that on the shell side of cooler/condenser 15 is 0.43 psia. (22.2 mm. of Hg.), and 569,753 BTU/hr. (166.8 kw.) of energy recovered. This recovered energy may be used to drive a compressor or pump 13; or, where item 13 is a generator, generate about 1,668 kilowatts of power over the 10-hour daylight period. The 130° F. (54.4° C.) air stream from hydrocarbon evaporator 9 is passed through line 38 into separator 39; 2,594 lb/hr. (1,179 kg/hr.) of 100% saturated air is recovered via line 7 and introduced thereby into solar pond 2. The 4,560 lb/hr. (2.073 kg/hr.) of potable water is recovered from separator 39 by way of conduit 40. Preferably, the heated air stream is circulated only during the 10-hour daylight period.

Vacuum flash separation zone 20, into which the heated salinous water in line 16, 8.06% saline (by weight), is introduced, is maintained at a subatmospheric pressure of about 5.99 psia. (309.8 mm. of Hg.). A salinous liquid phase, in the amount of 3,014 lb/hr. (1,370 kg/hr.), at a temperature of 170° F. (76.7° C.) is withdrawn through line 21, while the 86 lb/hr. (39.1 kg/hr.) of non-salinous vapors pass via line 18 into and through turbine 19. The latter has a downstream pressure of 0.43 psia. (22.2 mm. of Hg.), and will generate 13,588 BTU/hr. of power. The salinous liquid phase in line 21 is introduced thereby into vacuum flash separation zone 22 which is maintained at a lower subatmospheric pressure of 2.89 psia. (149.5 mm. of Hg.). The resulting salinous liquid phase, at a temperature of 140° F. (60° C.), in the amount of 2,932 lb/hr. (1,333 kg/hr.), is recovered by way of conduit 25; the 82 lb/hr. (37.3 kg/hr.) of non-salinous vapors pass via line 23 into turbine 24 to generate about 9,430 BTU/hr. of power. The salinous liquid phase in line 25 is introduced thereby into vacuum flash separation zone 26 which is maintained at a subatmospheric pressure of 1.27 psia. (65.7 mm. of Hg.). Salinous liquid, in the amount of 2,854 lb/hr. (1,297 kg/hr.), is withdrawn through line 32 at a temperature of 110° F. (43.3° C.) and introduced thereby into vacuum flash zone 33. A vaporous phase, in the amount of 78 lb/hr. (35.5 kg/hr.) passes through line 27 into turbine 28, from the resulting motion of which 5,304 BTU/hr. of power is generated.

Vacuum flash separation zone 33 is maintained at a subatmospheric pressure of about 0.43 psia. (22.2 mm. of Hg.) to provide a final liquid and vaporous phase at a temperature of about 75° F. (23.9° C.). The former, in the amount of about 2,768 lb/hr. (1,258 kg/hr.), including 250 lb/hr. (113.6 kg/hr.) of salt, is withdrawn through line 31 and returned thereby to the source of the salinous water. The vaporous phase in line 34, in the amount of about 86 lb/hr. (39.1 kg/hr.) is combined with the exit vapors from turbines 19, 24 and 28, in lines 29, 31 and 30, respectively, and the mixture introduced into cooler/condenser 35. The cooling medium is a second portion of the 70° F. (21.1° C.) deeper sea water from line 45; the warmed water is returned to the source by way of conduits 46 and 37. Additional potable water is recovered through lines 36 and 40. Heated water is withdrawn through line 16 continuously during the 24-hour cycle. Preferably, heated water is recycled through line 17 and fresh water is added to the solar pond through line 1 only during the 10-hour daylight cycle. The rate of water addition during the 10-hour cycle is greater than the rate of water removal by a factor which allows 24 hour/day removal of heated water.

With respect to cooler/condensers 15 and 35, if the ocean thermal gradient is not readily available and obtained, the heat-exchange medium will be a portion of the surface sea water diverted from line 1 through conduits 43 and 45, respectively. Where, however, an ocean thermal gradient is available, the colder, deeper water will be withdrawn from the source via line 47. A portion will be diverted through line 48 for introduction thereby into cooler/condenser 15 via line 43, the remainder continuing through line 47 and line 45 into cooler/condenser 35.

Total potable water recovery from the above-described process is 4,560 lb/hr. (2,073 kg/hr.), resulting from the water evaporated in solar pond 2 over the ten-hour period, plus 332 lb/hr. (150.9 kg/hr.) from the vacuum flash system over the 24-hour period. This translates to 53,568 lb. (24,349 kg.) per operating day, or 6,454 gal. (24,428 liters). Energy recovered is 569,753 BTU/hr. from the hydrocarbon turbine, over the 10-hour period, plus 28,322 BTU/hr. from the vacuum flash system over a 24-hour period. This translates into 6,377,258 BTU per operating day, or an average of 2,504 horsepower.

In one variation of the process as above described, a pressure recorder controller and valve is installed in line 11, and a temperature-indicating recorder in line 8. The latter produces an output signal representative of the temperature of the water-containing hot air stream from the solar pond 2, and transmits this signal to the pressure recorder controller, the set point of which is adjusted responsive thereto and the pressure on the shell side of evaporator 9 is regulated accordingly. Thus, where the hot air temperature increases, assuming constant air flow rates through solar pond 2, the evaporator pressure is increased. The temperature of the hydrocarbon vapors and the thermal efficiency of energy recovery, therefore, increase, assuming cooler/condenser 15 is maintained at constant temperature. Likewise, as the amount of insolation decreases, and thus the absorbed solar energy, the pressure in evaporator 9 is decreased, thus dictating a lower boiling point. The evaporator, therefore, more readily removes heat from the saturated air and the rate of water condensation is increased. This variation allows the efficient use of relatively warm cooling media in the condenser during high pressure operation while also increasing water collection during low pressure and low temperature operation. In another variation, the salinous water may be maintained within the solar pond for a longer period in order to effect a higher percentage of evaporation therefrom — i.e. up to about 90% by weight.

The foregoing description of the process encompassed by the present invention, particularly when viewed in conjunction with the description of the accompanying drawing, is believed to present a clear understanding thereof as well as the advantages afforded through its utilization.

I claim as my invention:

1. A process for simultaneously generating power and recovering potable water from a source of salinous water which comprises the sequential steps of:
    (a) introducing a portion of salinous water from said source into a solar radiation heat sink, at a rate greater than the total rate of water removal from said heat sink;
    (b) introducing an air stream into said solar radiation heat sink and flowing said air stream over said salinous water;
    (c) exposing said salinous water and said air stream, within said solar radiation heat sink, to absorbed radiant solar energy for a time sufficient to increase (i) the temperature of said salinous water and, (ii) the temperature and water content of said flowing air stream;
    (d) withdrawing the thus-heated, evaporated water-containing air stream from said solar radiation heat sink, reducing the temperature thereof and recovering potable, non-salinous water therefrom;
    (e) recycling the resulting cooled air stream to said solar radiation heat sink;
    (f) introducing heated salinous water, withdrawn from said solar radiation heat sink, into a plurality of vacuum flash separation zones, each succeeding one of which is maintained at a lower subatmospheric pressure than the preceding zone, (i) to produce substantially non-salinous vaporous phases equal in number to the number of flash separation zones and, (ii) wherein the salinous liquid phase is introduced in series through the plurality of zones; and,
    (g) passing each of said vaporous phases through a turbine and (i) cooling the exit vapors to recover additional non-salinous, potable water, and, (ii) generating power from the resulting turbine motion.

2. The process of claim 1 further characterized in that at least a portion of the heated salinous water withdrawn from said heat sink is recycled thereto.

3. The process of claim 1 further characterized in that said air stream is introduced into solar radiation heat sink at a temperature above about 120° F.

4. The process of claim 1 further characterized in that (i) said air stream and, (ii) and salinous water are withdrawn from said solar radiation heat sink at a temperature in the range of about 130° F. to about 210° F.

5. The process of claim 4 further characterized in that said air stream and said salinous water portion are withdrawn from said solar radiation heat sink at a temperature above about 150° F.

6. The process of claim 1 further characterized in that said salinous water is withdrawn from said solar radiation heat sink at a temperature higher than that of said air stream.

7. The process of claim 1 further characterized in that (i) said heated water-containing air stream indirectly contacts and vaporizes a hydrocarbon, and, (ii) the resulting vaporized hydrocarbon is introduced into and through a turbine, from the resulting motion of which energy is produced.

8. The process of claim 7 further characterized in that said hydrocarbon contains from about one to about four carbon atoms per molecule.

9. The process of claim 1 further characterized in that the first flash zone in said plurality is maintained at a subatmospheric pressure in the range of about 2.5 psia. to about 8.5 psia., and the last flash zone is maintained at a subatmospheric pressure in the range of about 0.9 psia. to about 3.5 psia.

10. The process of claim 9 further characterized in that the salinous liquid phase from the last flash separation zone is introduced into a separate vacuum flash separation zone maintained at a lower absolute pressure than said last flash zone to provide a non-salinous vaporous phase and a salinous liquid phase at a temperature not more than 15° F. higher than the temperature of the coldest salinous water removed from said source.

* * * * *